(12) United States Patent
Li et al.

(10) Patent No.: US 9,779,052 B2
(45) Date of Patent: Oct. 3, 2017

(54) PCIE BRIDGE TRANSFORMATION DEVICE AND METHOD THEREOF

(71) Applicant: APACER TECHNOLOGY INC., New Taipei (TW)

(72) Inventors: Liang-Cheng Li, New Taipei (TW); Chih-Hung Kuo, New Taipei (TW)

(73) Assignee: Apacer Technology Inc., New Taipei (TW)

( * ) Notice: Subject to any disclaimer, the term of this patent is extended or adjusted under 35 U.S.C. 154(b) by 132 days.

(21) Appl. No.: 15/002,801

(22) Filed: Jan. 21, 2016

(65) Prior Publication Data
US 2017/0139867 A1   May 18, 2017

(30) Foreign Application Priority Data
Nov. 16, 2015  (TW) .............................. 104137642 A

(51) Int. Cl.
| G06F 13/12 | (2006.01) |
| G06F 13/40 | (2006.01) |
| G06F 13/16 | (2006.01) |
| G06F 13/42 | (2006.01) |

(52) U.S. Cl.
CPC ...... *G06F 13/4031* (2013.01); *G06F 13/1605* (2013.01); *G06F 13/4068* (2013.01); *G06F 13/4282* (2013.01)

(58) Field of Classification Search
None
See application file for complete search history.

(56) References Cited

U.S. PATENT DOCUMENTS

| 9,426,147 B2 * | 8/2016 | Smith | .................... G06F 21/78 |
| 2012/0284772 A1 * | 11/2012 | Kwon | .................... G11C 16/22 |
| | | | 726/2 |

* cited by examiner

*Primary Examiner* — Cheng-Yuan Tseng
(74) *Attorney, Agent, or Firm* — Muncy, Geissler, Olds & Lowe, P.C.

(57) ABSTRACT

A PCIe bridge transformation device and a method thereof are provided, which is adapted to a storage unit in a lock state. The transformation device includes a connecting unit, a PCIe interface and a bridge. The connecting unit is connected to the storage unit and the connecting unit receives an identification command from the storage unit. The PCIe interface is electrically connected to an electronic unit. The bridge is installed with a first firmware for identifying an identification command. When the identification command is an access validity command, the first firmware unlocks the lock state of the storage unit, wherein the storage unit includes a second firmware corresponding to the first firmware, and the second firmware produces the identification command.

13 Claims, 5 Drawing Sheets

PCIE BRIDGE TRANSFORMATION DEVICE AND METHOD THEREOF

CROSS-REFERENCE TO RELATED APPLICATION

This application claims priority from Taiwan Patent Application No. 104137642, filed on Nov. 16, 2015, in the Taiwan Intellectual Property Office, the content of which is hereby incorporated by reference in their entirety for all purposes.

BACKGROUND OF THE INVENTION

1. Field of the Invention

This application relates to a transformation device, and more particularly, to a PCIe bridge transformation device and a method thereof applied to access the data in the lock state in a storage unit.

2. Description of the Related Art

It is necessary to safely access the storage unit in certain specific circumstances. The storage units may generally indicate hard drives, USBs and solid-state hard drives, and so on. For example, in order to avoid the confidential data leakage, companies may prohibit the employees from possessing the USB or external hard drive in the office. Nonetheless, such forbiddance still fails to avoid someone copying the confidential data leakage intentionally by USB, and external hard drive, and so on. Moreover, the employees may lose faith in the place where they have been working to because of the unfair policy.

As to another access validity for the storage unit is to install encrypted software in the computer host. All the data which is wrote in the storage unit through the computer host is encrypted by the encrypted software, and when the data in the storage unit is read through the computer host, it is also deciphered through the encrypted software. However, the methods mentioned above may have two shortcomings as follows.

1. The operation efficiency of the computer host degrades, resulting in inconvenience to the user.
2. The encrypted software is deciphered or duplicated easily, resulting in the data security decreases.

In conclusion, the inventor of the present disclosure has been mulling the technical problems over and then designs a PCIe bridge transformation device and a method thereof to improve the current shortcomings so as to promote the industrial practicability.

SUMMARY OF THE INVENTION

In view of the foregoing technical problems, one objective of the present disclosure provides a PCIe bridge transformation device and a method thereof to resolve the conventional technical problems.

In accordance with the aforementioned objective, the present disclosure provides a PCIe bridge transformation device adapted to a storage unit in a lock state. The transformation device may include a connecting unit, a PCIe interface and a bridge. The connecting unit may be connected to the storage unit, and the connecting unit may receive an identification command from the storage unit. The PCIe interface may be electrically connected to an electronic unit. The bridge may be installed with a first firmware to identify the identification command. When the identification command is an access validity command, the first firmware may unlock the lock state of the storage unit. Here, the storage unit may include a second firmware corresponding to the first firmware, and the second firmware may produce the identification command.

In accordance with the aforementioned objective, the present disclosure provides a PCIe bridge transformation device adapted to a storage unit in a lock state. The transformation device may include a connecting unit and a bridge. The connecting unit may be connected to a storage unit and the connecting unit may receive an identification command form the storage unit. The bridge may include a first firmware to identify the identification command. When the identification command is an access validity command, the first firmware may unlock the lock state of the storage unit. Here, the storage unit may include a second firmware corresponding to the first firmware, and the second firmware may produce the identification command.

In accordance with the aforementioned objective, the present disclosure further provides a method of transforming a bridge adapted to a PCIe bridge transformation device and a storage unit in a lock state. The transformation device may include a bridge and a connecting unit. The method may include the following steps of: connecting the storage unit to the connecting unit; transmitting a query command to the storage unit by a first firmware of the bridge; and transmitting an identification command to the first firmware by a second firmware of the storage unit. When the identification command is an access validity command, the first firmware may unlock the lock state of the storage unit.

As mentioned previously, a PCIe bridge transformation device and a method thereof of the present disclosure may have one or more advantages as follows.

1. Unlocking the lock state of the storage unit through the first firmware and the second firmware is capable of avoiding the lock state of the data in the storage unit being deciphered by the encrypted data, such that the data security of the storage unit is promoted.
2. Unlocking the lock state of the storage unit through the first firmware and the second firmware facilitates the operation efficiency of the computer host not to be affected.

DETAILED DESCRIPTION OF THE PREFERRED EMBODIMENTS

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention.

Figure 1:
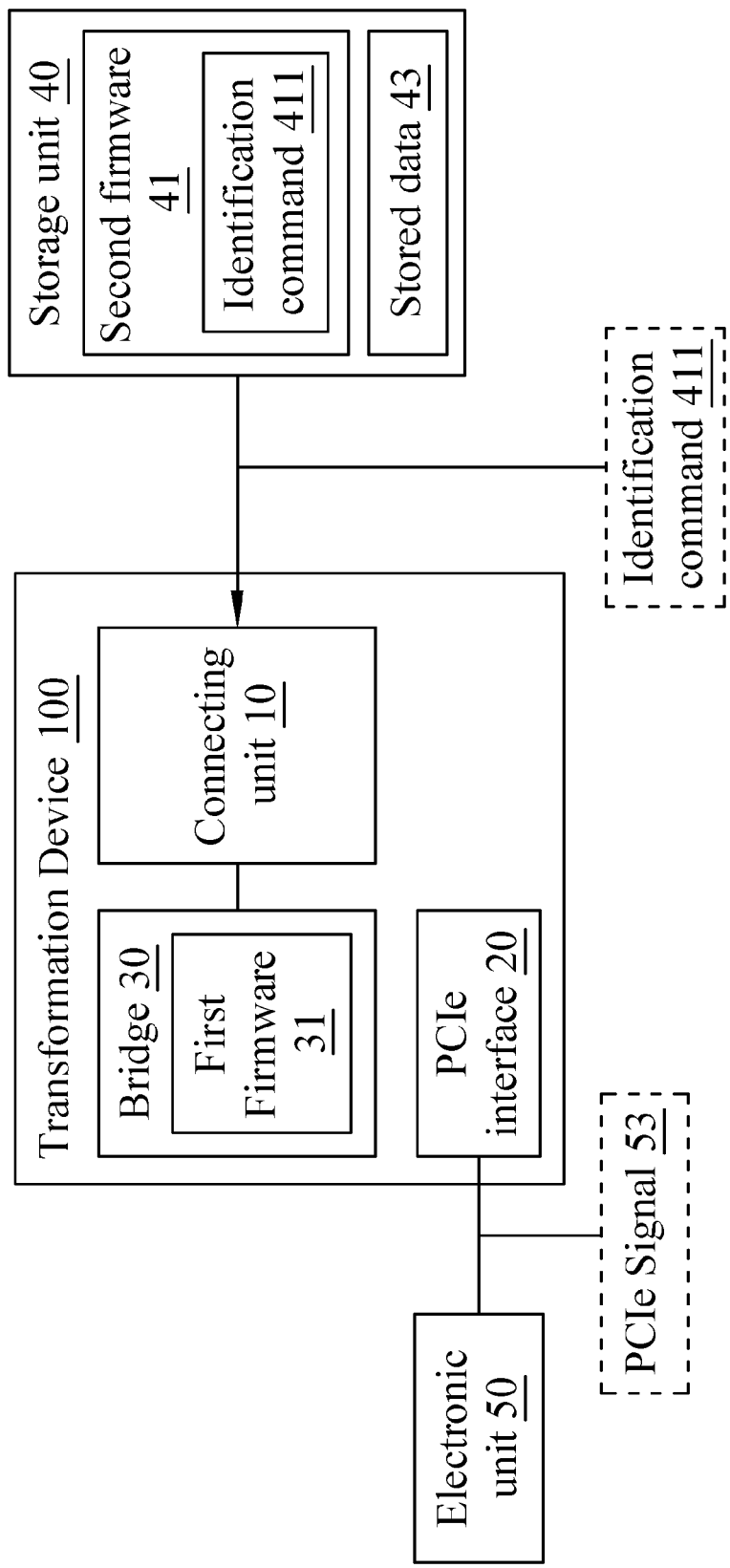
FIG. 1 is a block diagram of the first embodiment of the PCIe bridge transformation device of the present disclosure.

Please refer to FIG. 1, which is a block diagram of the first embodiment of the PCIe bridge transformation device of the present disclosure. As shown in the figure, a PCIe bridge transformation device 100 may be a transition card disposed with a PCIe interface which includes a connecting unit 10, a PCIe interface 20 and a bridge 30. Here, the connecting unit 10 is connected to a storage unit 40 and the connecting unit 10 receives an identification command 411 form the storage unit 40. The connecting unit 10 may be a USB port, a SATA port or a SAS port.

The storage unit 40 includes an external hard drive or a USB flash drive, and corresponds to a connection port of the connecting unit 10. The storage unit 40 is connected to the connecting unit 10 through a transmission line. The storage unit 40 includes data in a lock state. The PCIe interface 20 is electrically connected to an electronic unit 50. Here, the electronic unit 50 may be a computer host, a server, or a working station. The transformation device 100 is connected to the electronic device 50 through a PCIe slot disposed on the motherboard of the electronic unit 50 inserted to the PCIe interface 20.

The bridge 30 may be a chip. In addition to exchanging signals between the PCIe and USB/SATA/SAS, the bridge 30 can further be installed with a first firmware 31 for determining or identifying an identification command 411 from the storage unit 40. Specifically, when the user connects the storage unit 40 disposed with a second firmware 41 to the connecting unit 10 through the transmission line, the first firmware 31 transmits a detection signal to detect the storage unit 40, and the second firmware 41 produces the identification command 411 according to the detection and then transmits the identification command 411 to the bridge 30. When the first firmware 31 determines the identification command 411 that is an access validity command, the first firmware 31 unlocks the lock state of data in the storage unit 40.

It is worth mentioning that the second firmware 41 of the storage unit 40 has to correspond to the first firmware 31. When the first firmware 31 is updated, the second firmware 41 of the storage unit 40 has to be updated synchronously so as to ensure that the first firmware 31 can correctly determine the identification command 411 produced by the second firmware 41. The second firmware 41 producing the identification command 411 according to the detection signal belongs to the conventional means related to the firmware operation. Hence, the unnecessary details are not given herein.

Figure 2:
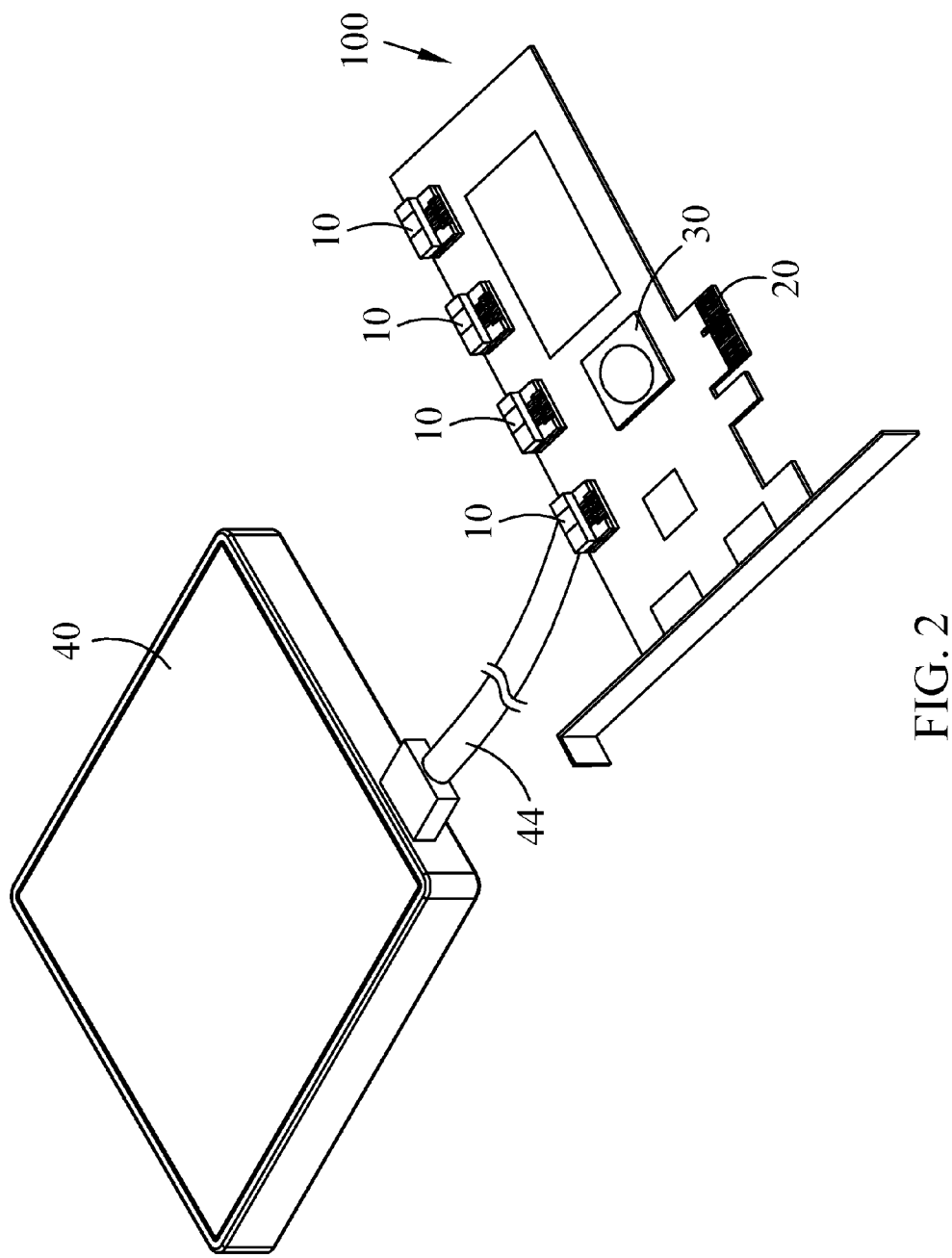
FIG. 2 is a schematic diagram of the first embodiment of the PCIe bridge transformation device of the present disclosure.

Please refer to FIG. 2, which is a schematic diagram of the first embodiment of the PCIe bridge transformation device of the present disclosure. Here, please refer to FIG. 1 together. In the present embodiment, a PCIe interface card is served as an exemplary embodiment to the PCIe bridge transformation device 100. A SATA port is applied to be an exemplary embodiment to the connecting unit 10. The connecting unit 10 is connected to the storage unit 40 through a SATA transmission line 44. Here, the storage unit 40 includes the second firmware 41 and stored data 43 in a lock state in the storage unit 40. It has to be noticed that the lock state mentioned herein includes a read-only state or an encrypted state. That is to say, the user is incapable of directly reading the stored data 43 or writing any data in the storage unit 40.

When the transformation device 100 is connected to a motherboard (not shown in the figures) of a computer host through the PCIe interface 20, the first firmware 31 of the bridge 30 is capable of detecting whether the connecting unit 10 is electrically connected to the storage unit 40 so as to ensure whether the storage unit 40 matches the first firmware 31 of the bridge 30 according to the identification command 411 transmitted from the storage unit 40. If the match is confirmed, the first firmware 31 transmits a command to unlock the stored data 43, or to trigger the second firmware 41 to unlock the stored data 43, facilitating the bridge 30 to correctly read the stored data 43 and to transform the PCIe signal and SATA signal of the stored data 43.

Figure 3:
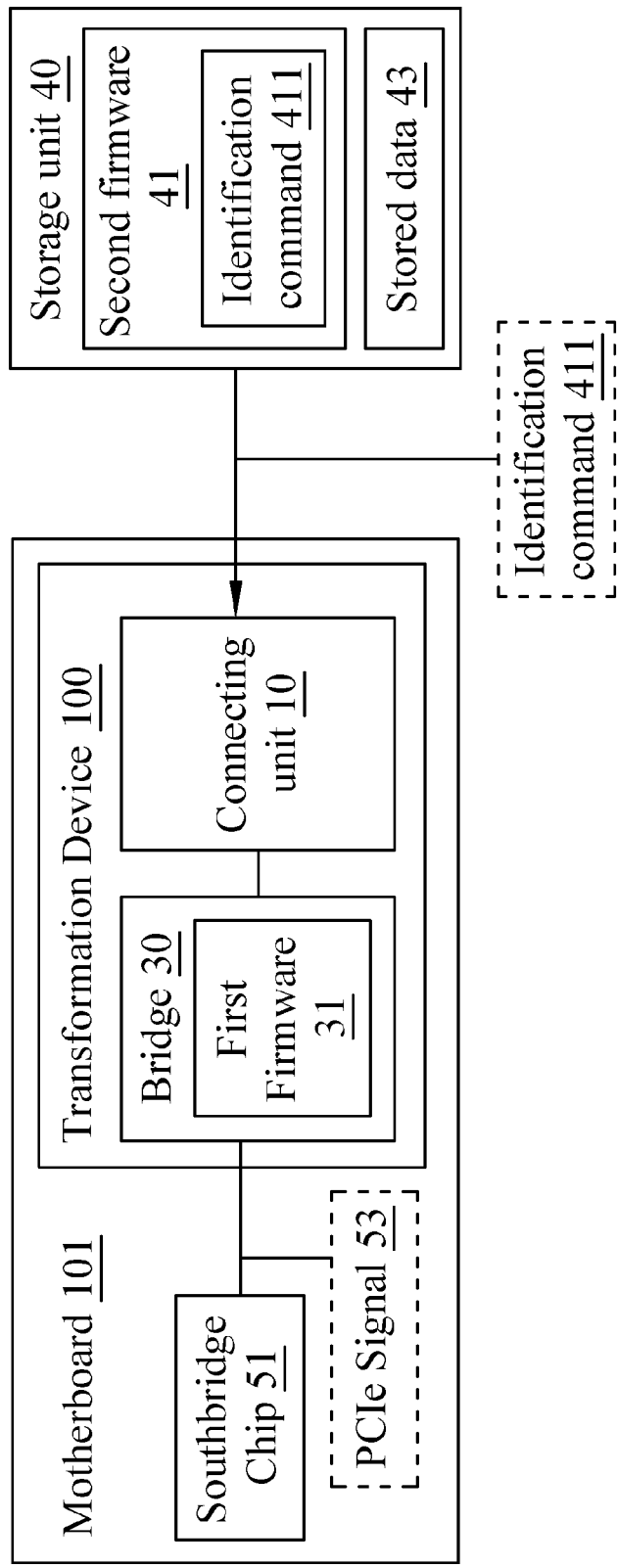
FIG. 3 is a block diagram of the second embodiment of the PCIe bridge transformation device of the present disclosure.

Please refer to FIG. 3, which is a block diagram of the second embodiment of the PCIe bridge transformation device of the present disclosure. As shown in the figure, the PCIe bridge transformation device 100 is adapted to the storage unit 40 in the lock state. The PCIe bridge transformation device 100 includes the connecting unit 10 and the bridge 30. The connecting unit 10 includes a USB port, a SATA port or a SAS port. The bridge 30 is a chip for exchanging signals between PCIe and USB/SATA/SAS.

The connecting unit 10 is connected to the storage unit 40, and the storage unit 40 receives the identification command 411. The bridge 30 includes the first firmware 31, and the first firmware 31 is configured to identify the identification command 411. When the first firmware 31 determines the identification command 411 that is an access validity command, the first firmware 31 unlocks the lock state of the stored data 43 of the storage unit 40. Here, the storage unit 40 includes the second firmware 41 corresponding to the first firmware 31, and the second firmware 41 produces the identification command 411.

To be more precise, the PCIe bridge transformation device 100 is disposed on a motherboard 101. The bridge 30 is electrically connected to a southbridge chip 51 on the motherboard 101 and the connecting unit 10. When the first firmware 31 determines the identification command 411 that is an access validity command and after the lock state of the stored data 43 is unlocked, the following paragraphs will detail how the motherboard 101 accesses the stored data 43 in the storage unit 40 through the PCIe bridge transformation device 100.

When write data is wrote in the storage unit 40, the southbridge chip 51 transmits write data having a PCIe signal to the bridge 30. Afterwards, the bridge 30 transforms the PCIe signal into a SATA signal and directly writes the data in the storage unit 40 through the connecting unit 10.

To the contrary, when the stored data 43 is read from the storage unit 40, the bridge 30 reads the stored data 43 in the storage unit 40 through the connecting unit 10 and then transforms the stored data 43 having the SATA signal transmitted from the connecting unit 10 into the PCIe signal. Next, the PCIe signal is transmitted to the southbridge chip 51 so as to complete reading the stored data 43.

Figure 4:
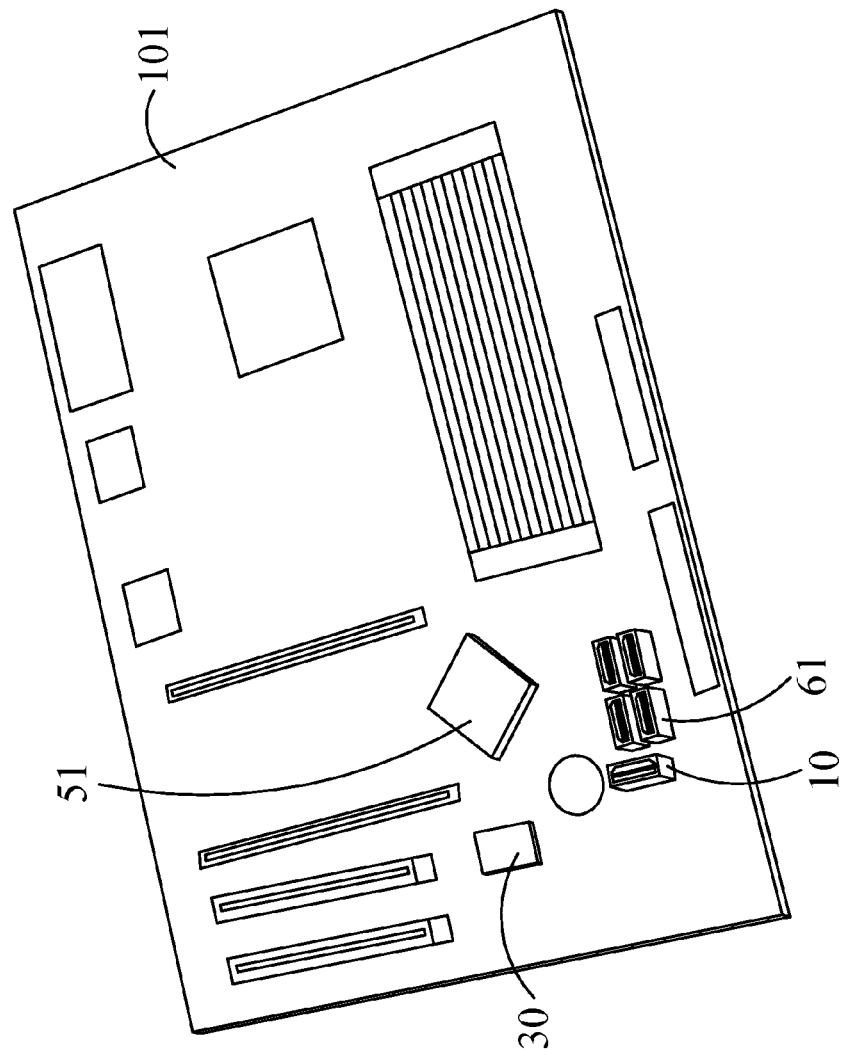
FIG. 4 is a schematic diagram of the second embodiment of the PCIe bridge transformation device of the present disclosure.

Please refer to FIG. 4, which is a schematic diagram of the second embodiment of the PCIe bridge transformation device of the present disclosure. Here, please refer to FIG. 3 together. In the present embodiment, the PCIe bridge transformation device 100 is disposed on the motherboard 101. The motherboard 101 is disposed with five SATA ports thereon. Four of the SATA ports 61 are provided by the motherboard 101. One of the SATA ports 61 is the connecting unit 10 of the present disclosure which is applied to transmit the SATA signal to the bridge 30. In the present embodiment, the bridge 30 is electrically connected to the south bridge chip 51 and the connecting unit 10. The operation of accessing the storage unit 40 has been described in the embodiment shown in FIG. 3, and the unnecessary details are no longer given herein.

Figure 5:
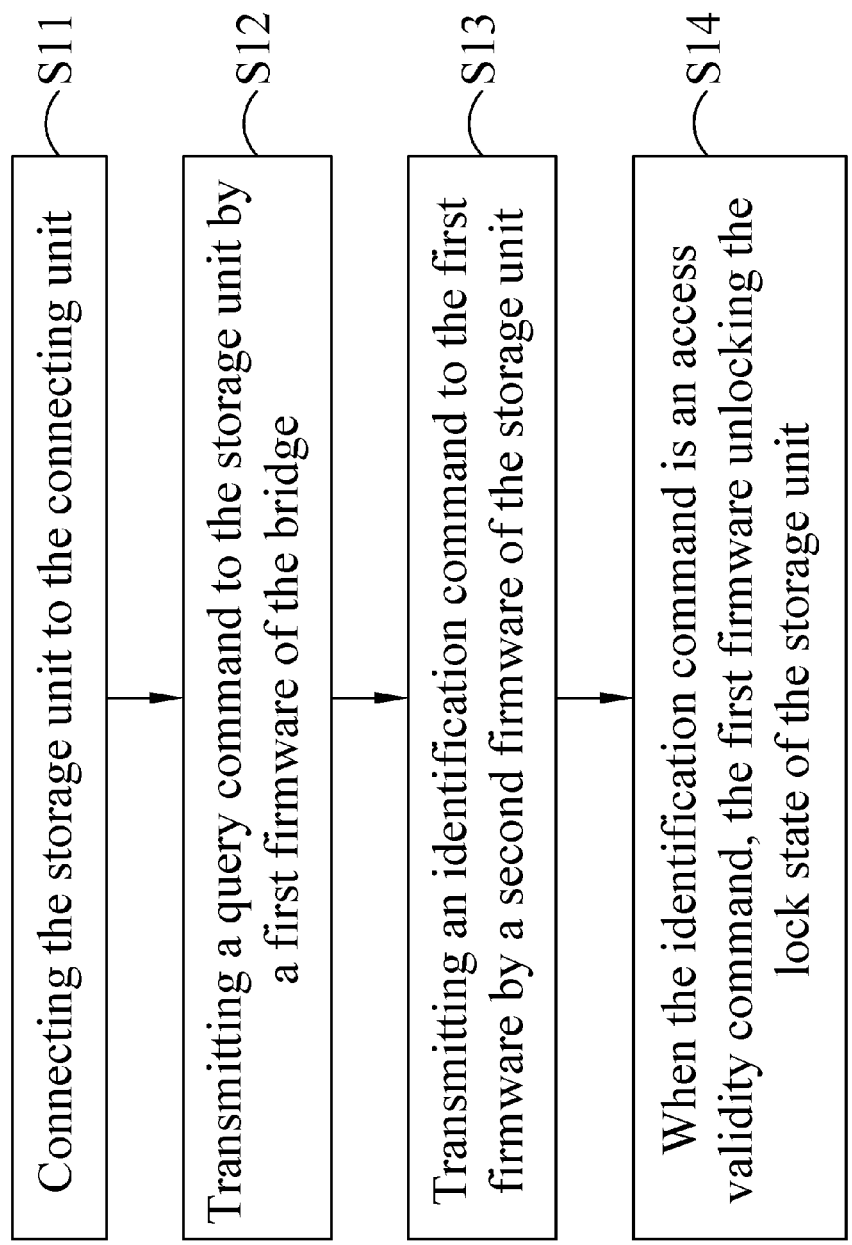
FIG. 5 is a flow chart of the method of the PCIe bridge transformation device of the present disclosure.

Please refer to FIG. 5, which is a flow chart of the method of the PCIe bridge transformation device of the present disclosure. As shown in the figure, the method of transforming a PCIe bridge is adapted to a PCIe bridge transformation device and a storage unit in a lock state. Here, the PCIe bridge transformation device includes a bridge and a connecting unit. The method comprises the following steps.

Step S11: connecting the storage unit to the connecting unit. Here, the connecting unit includes a USB port, a SATA port or a SAS port. The storage unit includes an external hard drive or a USB flash drive. The storage unit is connected to the connecting unit through a transmission line. In the present embodiment, a USB port is served as an exemplary embodiment.

Step S12: transmitting a query command to the storage unit by the first firmware of the bridge.

Step S13: transmitting an identification command to the first firmware by the second firmware of the storage unit. Here, the second firmware is triggered to produce the identification commend when the query command is received.

Step S14: when the identification command is an access validity command, the first firmware unlocking the lock state of the storage unit.

In addition, the aforementioned steps further include electrically connecting the bridge to the southbridge chip. After the lock state of the stored data is unlocked, the transformation method of the present disclosure further includes reading the stored data in the storage unit and transmitting the stored data to the bridge in the format of a first signal. Afterwards, the bridge transforms the first signal into a PCIe signal and then the PCIe signal is transmitted to the southbridge chip so as to complete reading the stored data. Alternatively, when write data is wrote in the storage unit, the write data is transmitted to the bridge in the format of the PCIe signal, and the bridge transforms the PCIe signal into the first signal and writes it in the storage unit so as to complete writing data. In the present embodiment, a USB signal is served as the first signal for an example, but it shall be not limited thereto. The first signal may be a SATA signal or a SAS signal.

Apart from the aforementioned embodiments, the transformation device of the present disclosure further includes a PCIe interface, and the transformation device of the present disclosure is connected to the electronic device through the PCIe interface. Here, the manner of connecting and accessing data has been described in the second embodiment, and the unnecessary details are no longer given herein.

In conclusion, the PCIe bridge transformation device and a method thereof of the present disclosure unlock the stored data of the storage unit through the matched firmware to effectively reduce the risk of the encrypted software being deciphered, such that the data security of the storage unit can be promoted. In addition, as the firmware directly controls the hardware operation, unlocking the lock state in the storage unit through the firmware will not affect the operation efficiency of the software application of the computer host.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A PCIe (Peripheral Component Interconnect Express) bridge transformation device adapted to a storage unit in a lock state, comprising:
   a connecting unit connected to a storage unit, the connecting unit receiving an identification command from the storage unit;
   a PCIe interface electrically connected to an electronic unit; and
   a bridge installed with a first firmware identifying the identification command, and when the identification command is an access validity command, the first firmware unlocking the lock state of the storage unit;
   wherein the storage unit comprises a second firmware corresponding to the first firmware, and the second firmware produces the identification command.

2. The PCIe bridge transformation device of claim 1, wherein the storage unit comprises an external hard drive or a universal serial bus (USB) flash drive.

3. The PCIe bridge transformation device of claim 1, wherein the connecting unit comprises a USB port, a SATA (Serial Advanced Technology Attachment) port or a Serial Attached Small Computer System Interface port.

4. A PCIe (Peripheral Component Interconnect Express) bridge transformation device adapted to a storage unit in a lock state, comprising:
   a connecting unit connected to the storage unit, the connecting unit receiving an identification command from the storage unit; and
   a bridge comprising a first firmware identifying the identification command, and when the identification command is an access validity command, the first firmware unlocking the lock state of the storage unit;
   wherein the storage unit comprises a second firmware corresponding to the first firmware, and the second firmware produces the identification command.

5. The PCIe bridge transformation device of claim 4, wherein the bridge is electrically connected to a southbridge chip.

6. The PCIe bridge transformation device of claim 4, wherein the connecting unit comprises a USB (Universal Serial Bus) port, a SATA (Serial Advanced Technology Attachment) port or a Serial Attached Small Computer System Interface port.

7. A method of transforming a bridge adapted to a PCIe (Peripheral Component Interconnect Express) bridge transformation device and a storage unit in a lock state, wherein the PCIe bridge transformation device comprises a bridge and a connecting unit, and the method comprising:
   connecting the storage unit to the connecting unit;
   transmitting a query command to the storage unit by a first firmware of the bridge;
   transmitting an identification command to the first firmware by a second firmware of the storage unit; and
   when the identification command is an access validity command, the first firmware unlocking the lock state of the storage unit.

8. The method of claim 7, wherein the transformation device further comprises a PCIe interface and the PCIe interface is electrically connected to an electronic unit.

9. The method of claim 7, wherein the connecting unit comprises a USB (Universal Serial Bus) port, a SATA (Serial Advanced Technology Attachment) port or a Serial Attached Small Computer System Interface port.

10. The method of claim 7, wherein the storage unit comprises an external drive or a universal serial bus (USB) flash drive.

11. The method of claim 7, further comprising electrically connecting the bridge to a southbridge chip.

12. The method of claim 11, further comprising:
reading stored data of the storage unit and transmitting the stored data to the bridge in the format of a first signal;
transforming the first signal into a PCIe signal; and
transmitting the PCIe signal to the southbridge chip.

13. The method of claim 11, further comprising:
transmitting write data to the bridge in the format of a PCIe signal;
transforming the PCIe signal into a first signal; and
transmitting the first signal to the storage unit.

* * * * *